US012435929B2

(12) United States Patent
Nett et al.

(10) Patent No.: US 12,435,929 B2
(45) Date of Patent: *Oct. 7, 2025

(54) RIBBED TUBELESS HEAT EXCHANGER FOR FLUID HEATING SYSTEMS INCLUDING A RIB COMPONENT AND METHODS OF MANUFACTURE THEREOF

(71) Applicant: Fulton Group N.A., Inc., Pulaski, NY (US)

(72) Inventors: Carl Nicholas Nett, Sandisfield, MA (US); Richard James Snyder, Mexico, NY (US); Keith Richard Waltz, Sandy Creek, NY (US)

(73) Assignee: FULTON GROUP N.A., INC., Pulaski, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,443

(22) Filed: Nov. 30, 2023

(65) Prior Publication Data
US 2024/0102740 A1    Mar. 28, 2024

Related U.S. Application Data

(60) Continuation of application No. 17/941,429, filed on Sep. 9, 2022, now Pat. No. 11,835,302, which is a
(Continued)

(51) Int. Cl.
*F28D 7/10* (2006.01)
*B21D 39/02* (2006.01)
(Continued)

(52) U.S. Cl.
CPC .............. *F28D 7/10* (2013.01); *B21D 39/02* (2013.01); *B21D 53/02* (2013.01); *B21D 53/04* (2013.01);
(Continued)

(58) Field of Classification Search
CPC .......................................................... F28D 7/10
See application file for complete search history.

(56) References Cited

U.S. PATENT DOCUMENTS 11,441,846 B2 * 9/2022 Nett ........................ F28D 7/026

\* cited by examiner

*Primary Examiner* — Raheena R Malik
(74) *Attorney, Agent, or Firm* — McCormick, Paulding & Huber PLLC

(57) ABSTRACT

A method for transferring heat between a first fluid and a second fluid includes providing a tubeless heat exchanger having a tubeless heat exchanger core, the tubeless heat exchanger core having an inner casing and an outer casing disposed around the inner casing, the inner and outer casings defining therebetween a flow passage for a thermal transfer fluid to flow, the tubeless heat exchanger core having a core inlet arranged to receive the first fluid and a core outlet arranged to provide the first fluid, the core inlet and core outlet being fluidically connected to the flow passage, and at least one of the core inlet and core outlet being disposed on the inner casing, wherein each of the outer casing and the inner casing has an inner surface and an outer surface, wherein the respective inner surfaces face each other and define therebetween the flow passage for the first fluid to flow from the core inlet to the core outlet and wherein at least a portion of the respective outer surfaces are arranged to be contacted by the second fluid, and providing the first fluid into the core inlet to transfer heat between the first fluid and the second fluid through at least a portion of both the inner and outer casings. In some embodiments, the first fluid may be a thermal transfer fluid, the second fluid may be a production fluid, and the production fluid may be held in a vessel, such as a pressure vessel.

20 Claims, 15 Drawing Sheets

Related U.S. Application Data continuation of application No. 16/298,571, filed on Mar. 11, 2019, now Pat. No. 11,441,846, which is a division of application No. 14/949,948, filed on Nov. 24, 2015, now Pat. No. 10,228,190.

(60) Provisional application No. 62/124,235, filed on Dec. 11, 2014.

(51) Int. Cl.
| | |
|---|---|
| *B21D 53/02* | (2006.01) |
| *B21D 53/04* | (2006.01) |
| *B21D 53/08* | (2006.01) |
| *B23P 15/26* | (2006.01) |
| *F28D 7/02* | (2006.01) |

(52) U.S. Cl.
CPC .............. *B21D 53/08* (2013.01); *B23P 15/26* (2013.01); *F28D 7/026* (2013.01)

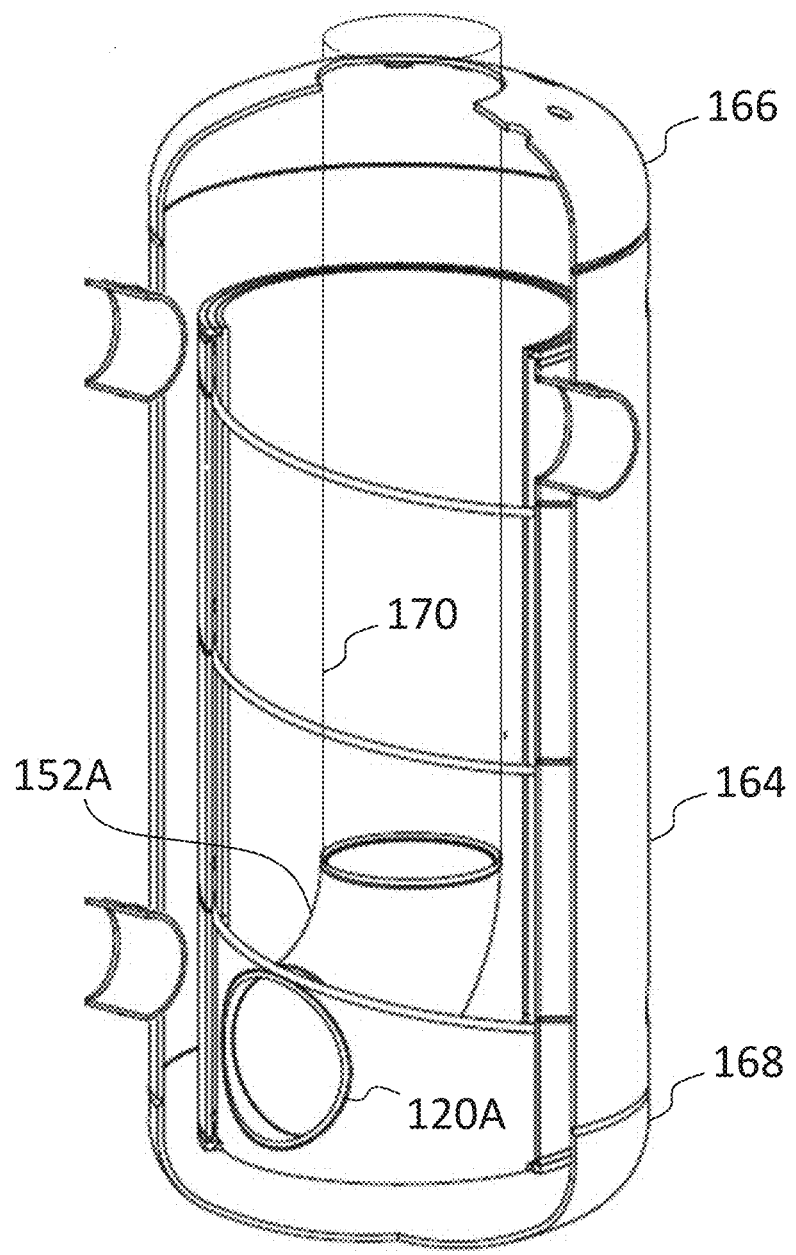

1124

1224

1361

1462

RIBBED TUBELESS HEAT EXCHANGER FOR FLUID HEATING SYSTEMS INCLUDING A RIB COMPONENT AND METHODS OF MANUFACTURE THEREOF

CROSS REFERENCE TO RELATED APPLICATIONS

This application is a continuation of U.S. patent application Ser. No. 17/941,429, filed Sep. 9, 2022, which is a continuation of U.S. patent application Ser. No. 16/298,571, filed Mar. 11, 2019, which is a divisional of U.S. patent application Ser. No. 14/949,948, filed Nov. 24, 2015, which claims priority to U.S. Provisional Patent Application Ser. No. 62/124,235, filed on Dec. 11, 2014, the entire disclosure of each application above are incorporated herein by reference to the extent permitted by applicable law.

BACKGROUND

Field of the Disclosure

This application relates to a tubeless heat exchanger for a fluid heating system, methods of manufacture of the tubeless heat exchanger, and fluid heating systems including the tubeless heat exchanger.

Description of the Related Art

Heat exchangers are used in fluid heating systems to transfer heat from a thermal transfer fluid, such as a combustion gas produced by combustion of a fuel such as petroleum or natural gas, to a production fluid. The production fluid can then be used for a variety of commercial, industrial, or domestic applications such as hydronic, steam, and thermal fluid boilers, for example. Because of the desire for improved energy efficiency, compactness, and cost reduction, there remains a need for improved heat exchangers, and fluid heating systems including the same, as well as improved methods of manufacture thereof.

SUMMARY

Disclosed is a heat exchanger including: a heat exchanger core including a top head, a bottom head, a first casing disposed between the top head and the bottom head, a second casing disposed between the top head and the bottom head, wherein an inner surface of the first casing is opposite an inner surface of the second casing, an inlet on the first casing, the second casing, or combination thereof, an outlet on the first casing, the second casing, or combination thereof, and a rib disposed between the first casing and the second casing, wherein the rib, the first casing, and the second casing define a flow passage between the inlet and the outlet; a pressure vessel; an inlet member on the inlet, which connects the inlet to an outside of the pressure vessel; and an outlet member on the outlet, which connects the outlet to an outside of the pressure vessel, wherein the bottom head, the first casing, and the second casing are contained entirely within the pressure vessel.

Also disclosed is a method of manufacturing a heat exchanger core, the method including: providing a first casing; disposing a rib on an inner surface of the first casing; providing a second casing including a slot; aligning the rib and the slot by disposing the first casing on the second casing; rigidly attaching the rib to the second casing; disposing a top head on a first end of each of the first casing and the second casing; disposing a bottom head on a second end of each of the first casing and the second casing; disposing an inlet on the first casing, the second casing, or a combination thereof; and disposing an outlet on the first casing, the second casing, or a combination thereof to manufacture the heat exchanger core, wherein the rib, the first casing, and the second casing define a flow passage between the inlet and the outlet.

Also disclosed is a method of manufacturing a heat exchanger core, the method including: providing a first casing; disposing a second casing including a slot on the first casing; disposing a rib through the slot; rigidly attaching the rib to at least one of the first casing and the second casing; disposing a top head on an upper end of each of the first casing and the second casing; disposing a bottom head on a lower end of each of the first casing and the second casing; disposing an inlet on the first casing, the second casing, or a combination thereof; and disposing an outlet on the first casing, the second casing, or a combination thereof to manufacture the heat exchanger core, wherein the rib, the first casing, and the second casing define a flow passage between the inlet the outlet.

Also disclosed is a method of manufacturing a heat exchanger core, the method including: providing a first casing; disposing a rib on an inner surface of the first casing; disposing a second casing member on an outer surface of the first casing, wherein the inner surface of the first casing is opposite an inner surface of the second casing member; rigidly attaching longitudinal edges of the second casing member to form a second casing; disposing a top head on an upper end of each of the first casing and the second casing; disposing a bottom head on a lower end of each of the first casing and the second casing; disposing an inlet on the first casing, the second casing, or combination thereof; and disposing an outlet on the first casing, the second casing, or combination thereof to manufacture the heat exchanger core, wherein the rib, the first casing, and the second casing define a flow passage between the inlet and the outlet.

Also disclosed is a method of manufacturing a heat exchanger core, the method including: providing a first casing and a second casing; disposing a rib on an inner surface of the first casing or on an inner surface of the second casing; heating or cooling at least one of the first casing and the second casing; disposing the second casing on the first casing; thermally equilibrating the first casing and the second casing to contact at least one of an inner surface of the first casing and the rib and an inner surface of the second casing and the rib; disposing a top head on an upper end of each of the first casing and the second casing; disposing a bottom head on a lower end of each of the first casing and the second casing; disposing an inlet on the first casing, the second casing, or combination thereof; disposing an outlet on the first casing, the second casing, or combination thereof to manufacture the heat exchanger core, wherein the rib, the first casing, and the second casing define a flow passage between the inlet and the outlet.

Also discussed is a method of manufacturing a heat exchanger core, the method including: providing a first casing; disposing a rib on an inner surface of the first casing; disposing a second casing on the rib; deforming at least one of the first casing and the second casing to contact at least one of the first casing and the rib and the second casing and the rib; disposing a top head on an upper end of each of the first casing and the second casing; disposing a bottom head on a lower end of each of the first casing and the second casing; disposing an inlet on the first casing, the second casing, or combination thereof; and disposing an outlet on the first casing, the second casing, or combination thereof to manufacture the heat exchanger core, wherein the rib, the first casing, and the second casing define a flow passage between the inlet and the outlet.

Also disclosed is a method of manufacturing a heat exchanger core, the method including: providing a first casing; disposing a tubular rib on an inner surface of the first casing; disposing the first casing on a second casing; expanding the rib to contact the expanded rib and the first casing and the expanded rib and the second casing; disposing a top head on an upper end of each of the first casing and the second casing; disposing a bottom head on a lower end of each of the first casing and the second casing; disposing an inlet on the first casing, the second casing, or combination thereof; and disposing an outlet on the first casing, the second casing, or combination thereof to manufacture the heat exchanger core, wherein the rib, the first casing, and the second casing define a flow passage between the inlet and the outlet.

Also disclosed is a method of manufacturing a heat exchanger core, the method including: providing a first casing; disposing a rib on an inner surface of the first casing; providing a second casing, wherein an inner surface of the second casing includes a groove, which is configured to receive the rib; rotating the first casing relative to the second casing to thread the first casing into the second casing to dispose the first casing in or on the second casing; optionally expanding or contracting at least one of the first casing and the second casing so that the rib contacts the first casing and the second casing; disposing a top head on an upper end of each of the first casing and the second casing; disposing a bottom head on a lower end of each of the first casing and the second casing; disposing an inlet on the first casing, the second casing, or combination thereof; and disposing an outlet on the first casing, the second casing, or combination thereof to manufacture the heat exchanger core, wherein the rib, the first casing, and the second casing define a flow passage between the inlet and the outlet.

Also disclosed is a method of manufacturing a heat exchanger core, the method including: providing a first casing; disposing a rib on an inner surface of the first casing; contacting the rib and an inner surface of a second casing by disposing the first casing on the outer casing; disposing a top head on an upper end of each of the first casing and the second casing; disposing a bottom head on a lower end of each of the first casing and the second casing; disposing an inlet on the first casing, the second casing, or combination thereof; and disposing an outlet on the first casing, the second casing, or combination thereof to manufacture the heat exchanger core, wherein the rib, the first casing, and the second casing define a flow passage between the inlet and the outlet.

Also disclosed is a method of manufacturing a heat exchanger, the method including: providing a shell; disposing a pressure vessel bottom head on the shell; disposing the heat exchanger core in the shell; and disposing a pressure vessel top head on the shell to manufacture the heat exchanger, wherein the pressure vessel top head, the pressure vessel bottom head, the shell, or a combination thereof, includes a pressure vessel inlet, and wherein the pressure vessel top head, the pressure vessel bottom head, the shell, or a combination thereof includes a pressure vessel outlet.

Also disclosed is a method of transferring heat between a first fluid and a second fluid, the method including: providing the heat exchanger; directing a first fluid into a pressure vessel inlet of the pressure vessel; and directing a second fluid into the inlet of the heat exchanger core to exchange heat between the first fluid and the second fluid.

BRIEF DESCRIPTION OF THE DRAWINGS

The above and other advantages and features of this disclosure will become more apparent by describing in further detail exemplary embodiments thereof with reference to the accompanying drawings, in which:

FIG. 1B is a schematic cut-away view of another embodiment of the heat exchanger;

DETAILED DESCRIPTION

Figure 1A:
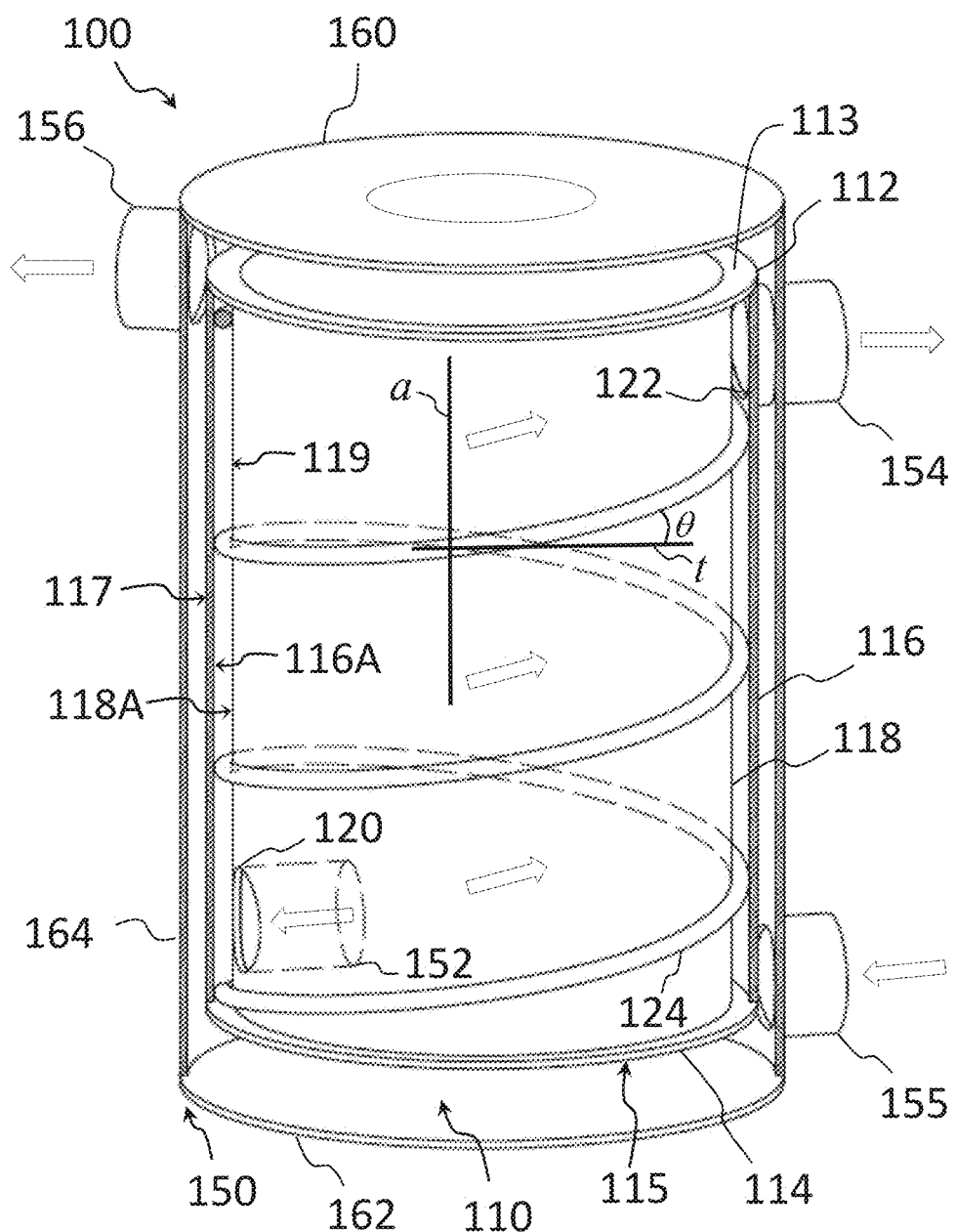
FIG. 1A is a schematic cut-away view of an embodiment of a heat exchanger.

Heat exchangers are desirably thermally compact, provide a high ratio of the thermal output to the total size of the heat exchanger, and have a design which can be manufactured at a reasonable cost. This is particularly true of gas-liquid heat exchangers, which can be incorporated into hydronic (e.g., liquid water), steam, and thermal fluid heating systems designed to deliver a hot fluid such as steam for temperature regulation, domestic hot water, or commercial or industrial process applications.

Tube-and-shell heat exchanger designs suffer a variety of drawbacks. In a tube-and-shell heat exchanger, the heat is transferred from the thermal transfer fluid, e.g., a combustion gas generated by a fuel-fired combustor and driven under pressure through the heat exchanger by a blower, to a production fluid (e.g., liquid water, steam, or another thermal fluid) across the walls of numerous thin-walled fluid conduits, i.e. tubes, having a wall thickness of less than 0.5 centimeters (cm). The tubes are rigidly connected to a tubesheet. Operational factors including thermal stress and corrosion lead to undesirable material failures in the tubes of tube-and-shell heat exchangers, the attachment points of the tubes, and in the tubesheets. Furthermore, when a failure occurs, the fluid heating system is rendered inoperable, and the thin-walled heat exchanger tubes and/or tubesheets are difficult and costly to service or replace, particularly in field installations.

Tubeless heat exchangers are also used. Tubeless heat exchangers avoid the use of the thin-walled tubes and the tubesheets associated with tube—and shell heat exchangers. Known practical designs for tubeless heat exchangers also have drawbacks. In available tubeless heat exchangers, the pressure vessel outer shell contacts a hot heat transfer fluid, e.g., along the exit path of the flue gas exhaust, resulting in a hot surface on the outside of the pressure vessel. To accommodate the hot outer surface, a refractory barrier outside the pressure vessel is provided, wherein the refractory barrier is separated from the pressure vessel by a gap through which the hot thermal transfer fluid flows, e.g., through an array of longitudinal ribs, thereby transferring thermal energy from the thermal transfer fluid into the outside of the shell, and ultimately transferring heat to the production fluid. Such tubeless designs suffer from refractory deterioration and loss of thermal efficiency due to some amount of heat being transferred into and through cracks in the refractory layer, and ultimately into the environment around the boiler. Additionally, flue gas, which can comprise CO, can leak through the cracks in the refractory layer and into occupied areas, instead of flowing to a flue gas discharge stack, creating health hazard. Furthermore, the hot outer surface of the pressure vessel presents safety issues due to the temperature of the skin which overlays the refractory material and due to leaking of thermal transfer fluid (e.g. flue gas) through cracks in the refractory material.

The disclosed heat exchanger provides a variety of features. For example, in the disclosed heat exchanger there is no direct contact between the thermal transfer fluid and the outer surface of the pressure vessel shell, thereby obviating the need for a refractory lining and avoiding safety, maintenance, and reliability concerns from a hot pressure vessel outer shell. Furthermore, the disclosed heat exchanger avoids use of thin-walled tubing, thereby avoiding the inherent fragility and susceptibility to material failure and corrosion of thin-walled tubing. The disclosed heat exchanger can be provided using metal alloy tubing having an average wall thickness of 0.5 to 5 cm, for example, as the primary member between the thermal transfer fluid and the production fluid, and thus can avoid the fragility problems associated with thin-walled tubing. In an embodiment, the disclosed heat exchanger can also avoid tight turnabouts in flow passages for both the thermal transfer fluid and the production fluid, thereby avoiding configurations that would be susceptible to fouling, clogging, and corrosion blockage. In addition, the disclosed heat exchanger provides for improved compactness (i.e., energy density, having the units of kilowatts per cubic meter, kW/m 3) and improved performance characteristics compared to tube-and-shell heat exchanger alternatives of the same production capability. As is further disclosed herein, in an embodiment of the disclosed heat exchanger all outer surfaces of the heat exchanger core are contacted by the production fluid, thereby fully utilizing the outer surfaces of the heat exchanger core for thermal energy transfer and avoiding thermal stress in the heat exchanger core. The efficiency of the disclosed design provides for reduced material requirements and reduced manufacturing complexity.

A heat exchanger comprises: a heat exchanger core comprising a top head; a bottom head; a first casing disposed between the top head and the bottom head; a second casing disposed between the top head and the bottom head, wherein an inner surface of the first casing is opposite an inner surface of the second casing; an inlet on the first casing, the second casing, or combination thereof; an outlet on the first casing, the second casing, or combination thereof; a rib disposed between the first casing and the second casing, wherein the rib, the first casing, and the second casing define a flow passage between the inlet and the outlet; a pressure vessel; an inlet member on the inlet, which connects the inlet to an outside of the pressure vessel; and an outlet member on the outlet, which connects the outlet to an outside of the pressure vessel, wherein the bottom head, the first casing, and the second casing are contained entirely within the pressure vessel, and wherein "inner surface" when used to indicate a surface of the first casing or the second casing is defined relative to the flow passage. Thus the inner surface of the first casing, the inner surface of the second casing, and the rib define the flow passage.

In an embodiment the first casing can be surrounded by the second casing, in which case the first casing may be an inner casing and the second casing may be an outer casing. Alternatively, the second casing can be surrounded by the first casing, in which case the second casing may be an inner casing and the first casing may be an outer casing. As shown in FIG. 1A, a heat exchanger 100 comprises: a heat exchanger core 110 comprising a top head 112; a bottom head 114; a first casing 116 disposed between the top head and the bottom head; a second casing 118 disposed between the top head and the bottom head, wherein an inner surface 116A of the first casing 116 is opposite an inner surface 118A of the second casing; an inlet 120 on the second casing; an outlet 122 on the first casing; a rib 124 disposed between the first casing and the second casing, wherein the rib, the first casing, and the second casing define a flow passage between the inlet and the outlet; a pressure vessel 150; an inlet member 152 on the inlet and which connects the inlet to an outside of the pressure vessel; and an outlet member 154 on the outlet and which connects the outlet to an outside of the pressure vessel, wherein the bottom head, the first casing, and the second casing are contained entirely within the pressure vessel. The inner surface 116A of the first casing and the inner surface 118A of the second casing are interior to the flow passage defined by the first casing 116, the second casing 118, and the rib 124. Also shown in FIG. 1A is the pressure vessel top head 160, the pressure vessel bottom head 162, and the pressure vessel shell 164 which is disposed between the pressure vessel top head and the pressure vessel bottom head. The pressure vessel top head, the pressure vessel bottom head, or combination thereof may comprise an opening for a conduit (not shown in FIG. 1A). The conduit is connected to the inlet member 152, and may pass through the pressure vessel top head 160 and the top head 112 of the heat exchanger core.

Another embodiment of the heat exchanger core is shown in FIG. 1B. As shown in FIG. 1B, a curved inlet member 152A may be connected to an inlet 120A. Also shown in FIG. 1B is a conduit 170 which connects the inlet member to an outside of the heat exchanger. For example, as shown in FIG. 1B, the conduit may pass through the pressure vessel top head and the top head of the heat exchanger core.

The top head, the bottom head, the first casing, the second casing, the inlet, the outlet, the rib, the pressure vessel, the inlet member, and the outlet member, can each independently comprise any suitable material. Use of a metal is specifically mentioned. Representative metals include iron, aluminum, magnesium, titanium, nickel, cobalt, zinc, silver, copper, and an alloy comprising at least one of the foregoing. Representative metals include carbon steel, mild steel, cast iron, wrought iron, a stainless steel such as a 300 series stainless steel or a 400 series stainless steel (e.g., 304, 316, or 439 stainless steel), Monel, Inconel, bronze, and brass. Specifically mentioned is an embodiment in which the heat exchanger core and the pressure vessel each comprise steel, specifically mild steel.

Figure 2:
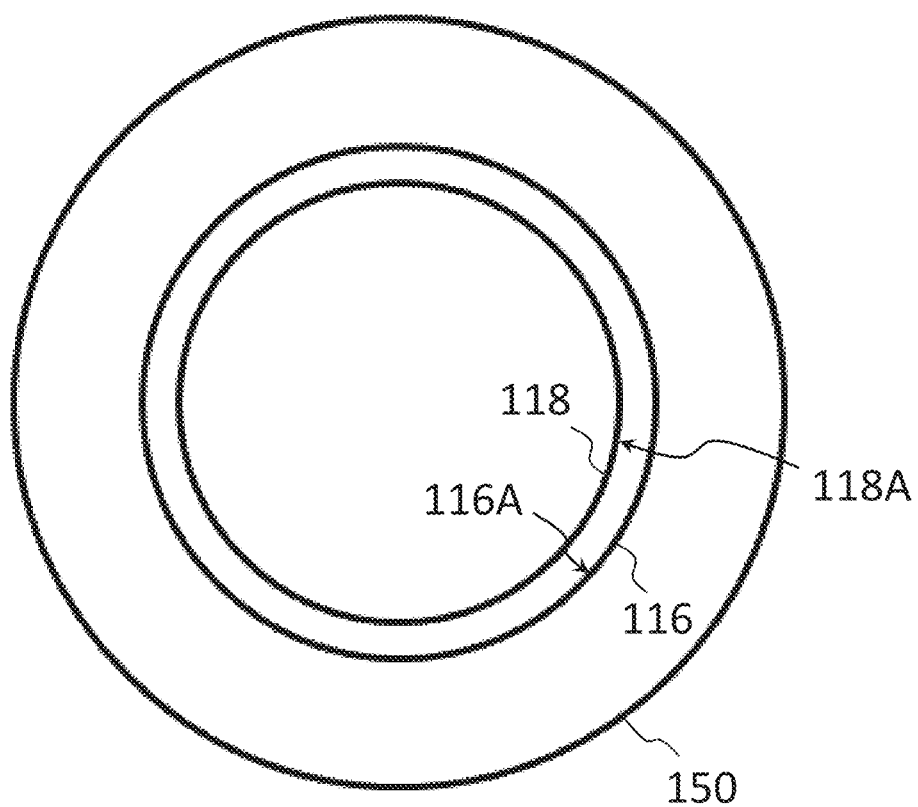
FIG. 2 is a cross-sectional diagram showing a top view of an embodiment of a first casing, a second casing, and a pressure vessel.

The first casing and the second casing may be coaxial, and may be concentric. In an embodiment, the first casing and the second casing are coaxial, as shown in FIGS. 1A, 1B, and 2. Non-coaxial configurations are also contemplated.

Figure 3:
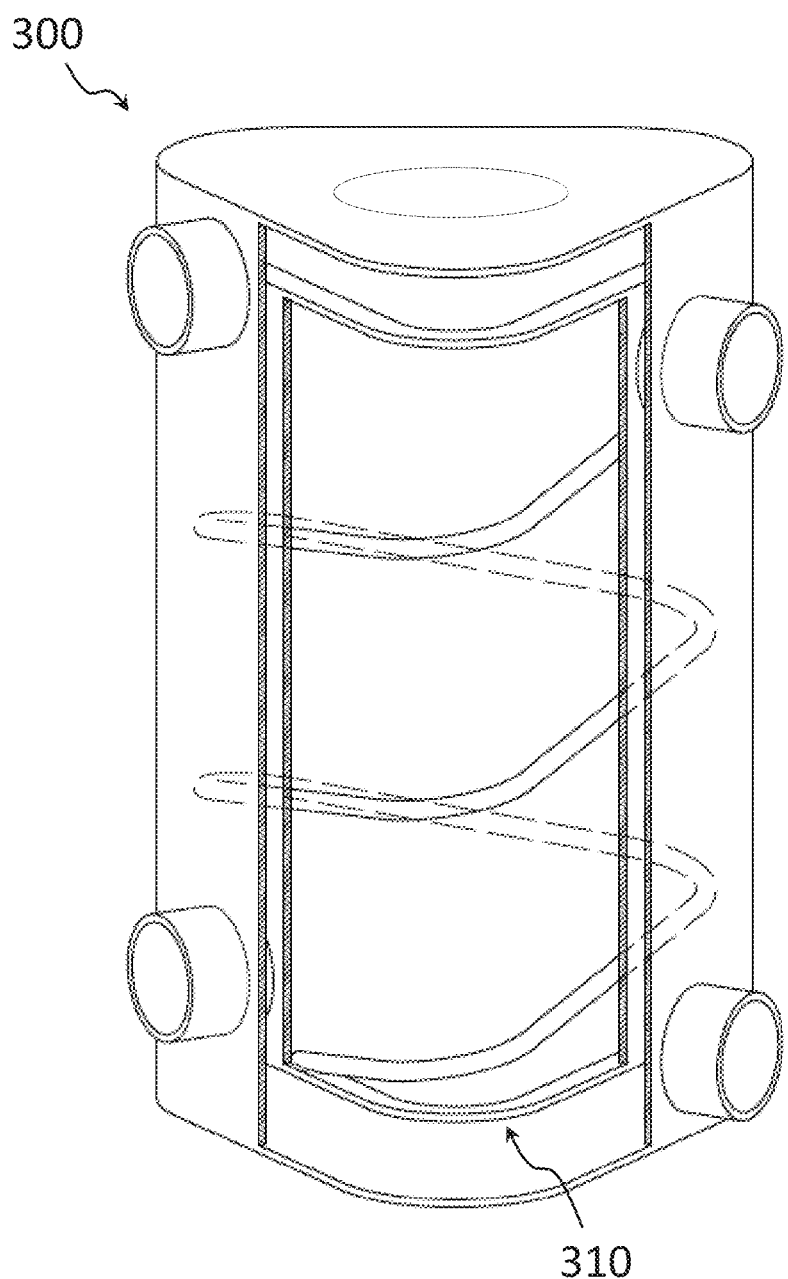
FIG. 3 is a schematic cut-away view of another embodiment of the heat exchanger.

The first casing and the second casing of the heat exchanger core may have any suitable shape and may each independently have a circular cross-sectional shape, an elliptical cross-sectional shape, an oval cross-sectional shape, a stadium cross-sectional shape, a semicircular cross-sectional shape, a square cross-sectional shape, a rectangular cross-sectional shape, a triangular cross-sectional shape, or combination thereof. For example, shown in FIG. 3 is an embodiment of a heat exchanger 300 comprising a heat exchanger core 310 having a triangular cross-sectional shape. An embodiment in which the first casing, e.g., the inner casing, and the second casing, e.g., the outer casing, each have a cylindrical shape is specifically mentioned.

In an embodiment, the first casing and the second casing may have a same cross-sectional shape, however other configurations are contemplated. For example, the heat exchanger core may comprise a first casing having a triangular cross-sectional shape and a second casing having a cylindrical cross-sectional shape.

The first casing and the second casing may each independently have a largest outer diameter of 15 centimeters (cm), 25 cm, or 30 cm to 350 cm, 650 cm, or 1,400 cm, wherein the foregoing upper and lower bounds can be independently combined. For example, the first casing and the second casing may each independently have a largest outer diameter of 15 cm to 1,400 cm. An embodiment in which the first casing and the second casing each independently have a largest outer diameter of 30 cm to 350 cm is preferred. Alternatively, the first casing and the second casing may each independently have a largest outer diameter of 50 cm, 100 cm, or 200 cm to 500 cm, 700 cm, or 1,400 cm, wherein the foregoing upper and lower bounds can be independently combined.

The first casing and the second casing may each independently have a maximum height of 15 cm, 25 cm, or 30 cm to 350 cm, 650 cm, or 1,400 cm, wherein the foregoing upper and lower bounds can be independently combined, and wherein the height is determined in a direction of a major axis. For example, the first casing and the second casing may each independently have a maximum height of 15 cm to 1,400 cm. Alternatively, the first casing and the second casing may each independently have a height of 50 cm, 100 cm, or 200 cm to 500 cm, 700 cm, or 1,400 cm, wherein the foregoing upper and lower bounds can be independently combined.

An embodiment in which the first casing and the second casing each independently have a largest outer diameter of 30 cm to 350 cm and a height of 50 cm to 1,000 cm is preferred.

A top head is disposed on a first end of the first casing and the second casing, and a bottom head is disposed on a second opposite end of the first casing and the second casing. The top head and the bottom head may each independently be rigidly attached to the first casing and the second casing by any suitable method, such as by a weld, an adhesive, a fastener, or a combination thereof. An embodiment in which the top head and the bottom head are each welded to the first casing and the second casing is specifically mentioned. As shown in FIG. 1A, the top head and the bottom head of the heat exchanger are distinct members. However, other designs are contemplated. For example, the top head and the bottom head may each independently be formed by providing a weld seam between the first casing and the second casing. Alternatively, the ends of the first casing and the second casing may be contacted, e.g., pinched together or rolled, to form the top head and the bottom head.

A thickness, e.g., an average thickness, of the top head, the bottom head, the first casing, and the second casing may be any suitable dimension, and the thickness of the top head, the bottom head, the first casing, and the second casing may each independently be 0.5 cm, 0.6 cm, 0.7 cm, or 1 cm to 5 cm, 4 cm, 3.5 cm, or 3 cm, wherein the foregoing upper and lower bounds can be independently combined. An embodiment in which the top head, the bottom head, the first casing, and the second casing each independently have a thickness of 0.5 cm to 1 cm is specifically mentioned.

An inner surface 116A of the first casing 116, an inner surface 118A of the second casing 118, and the rib 124 define a flow passage between the inlet and the outlet of the heat exchanger core, which comprises, e.g., consists of, the first casing, the second casing, the rib, and the top head and the bottom head of the heat exchanger core. It has been surprisingly discovered that certain configurations of the flow passage provide improved performance, including a desirable combination of pressure drop between the inlet and the outlet, and thermal performance. This improvement can be parameterized in terms of an aspect ratio of the flow passage, wherein the aspect ratio of the flow passage defined as the maximum centerline dimension divided by the minimum centerline dimension of the flow passage, where both dimensions are determined normal to a flow direction and perpendicular to each other, and wherein the shorter dimension is defined at the midpoint of the longer dimension. It has been further surprisingly discovered that configurations wherein an aspect ratio of the flow passage is 3, 5, 10, 100, 200 or 500, preferably 10 to 100, provide an improved combination of pressure drop and thermal performance, wherein the foregoing upper and lower bounds can be independently combined.

Figure 4:
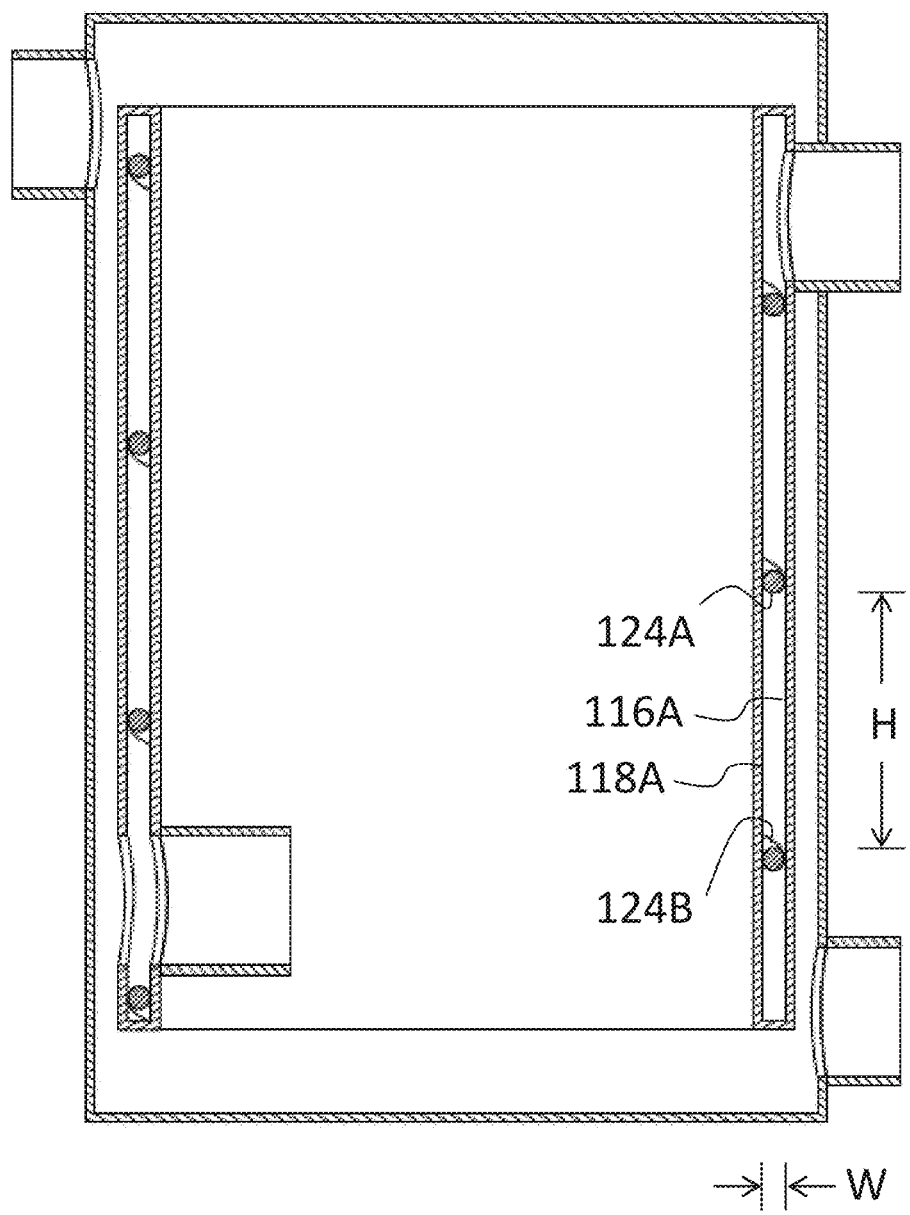
FIG. 4 is a cross-sectional view of an embodiment of the heat exchanger.

Determination of the aspect ratio is illustrated in FIG. 4, which indicates determination of the height h and the width w of an embodiment of the flow passage. As shown in FIG. 4, the height h can be determined between opposite surfaces of a same rib, e.g., between a first rib surface 124A, and a second rib surface 124B when viewed in a cross-sectional dimension, and the width w is determined between and inner surface 116A of the first casing 116 and an inner surface 118A of the second casing 118. Alternatively, for example when a plurality of ribs are used, the height h can be determined between opposite surfaces of neighboring ribs. For example, the height h of the flow passage may be 0.6 cm to 600 cm, and may be 0.6 cm, 1 cm, 2 cm, 4 cm, 10 cm, 20 cm, 40 cm, 80 cm, or 160 cm to 600 cm, 550 cm, 500 cm, 450 cm, 400 cm, 350 cm, 300 cm, or 250 cm, wherein the foregoing upper and lower bounds can be independently combined. Also the width may be 0.6 cm to 600 cm, and may be 0.6 cm, 1 cm, 2 cm, 4 cm, 10 cm, 20 cm, 40 cm, 80 cm, or 160 cm to 600 cm, 550 cm, 500 cm, 450 cm, 400 cm, 350 cm, 300 cm, or 250 cm, wherein the foregoing upper and lower bounds can be independently combined. In a preferred embodiment, the height is 20 cm to 60 cm and the width is 1 cm to 4 cm. In a more preferred embodiment, the height is 40 cm to 45 cm and the width is 1.2 cm to 1.9 cm. In another more preferred embodiment, the height is 45 cm to 50 cm and the width is 1.5 cm to 3 cm.

Figure 5:
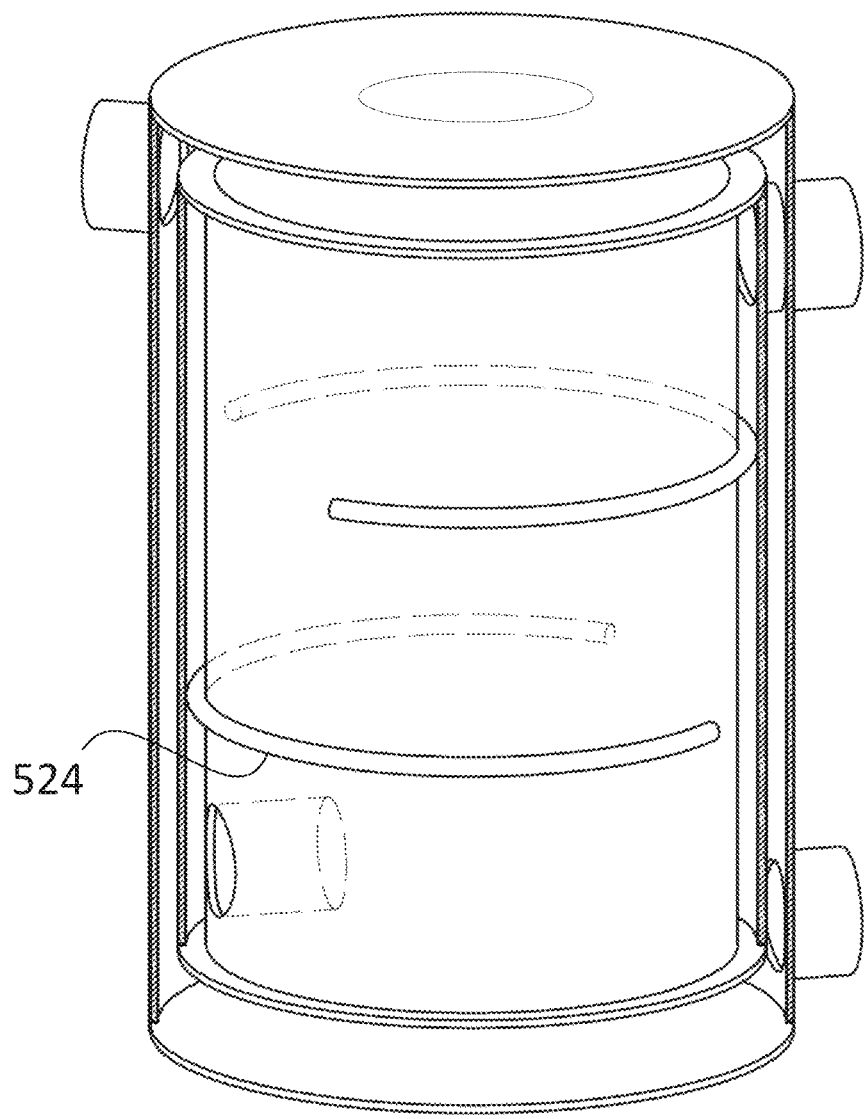
FIG. 5 is a schematic cut-away view of another embodiment of the heat exchanger.
Figure 6:
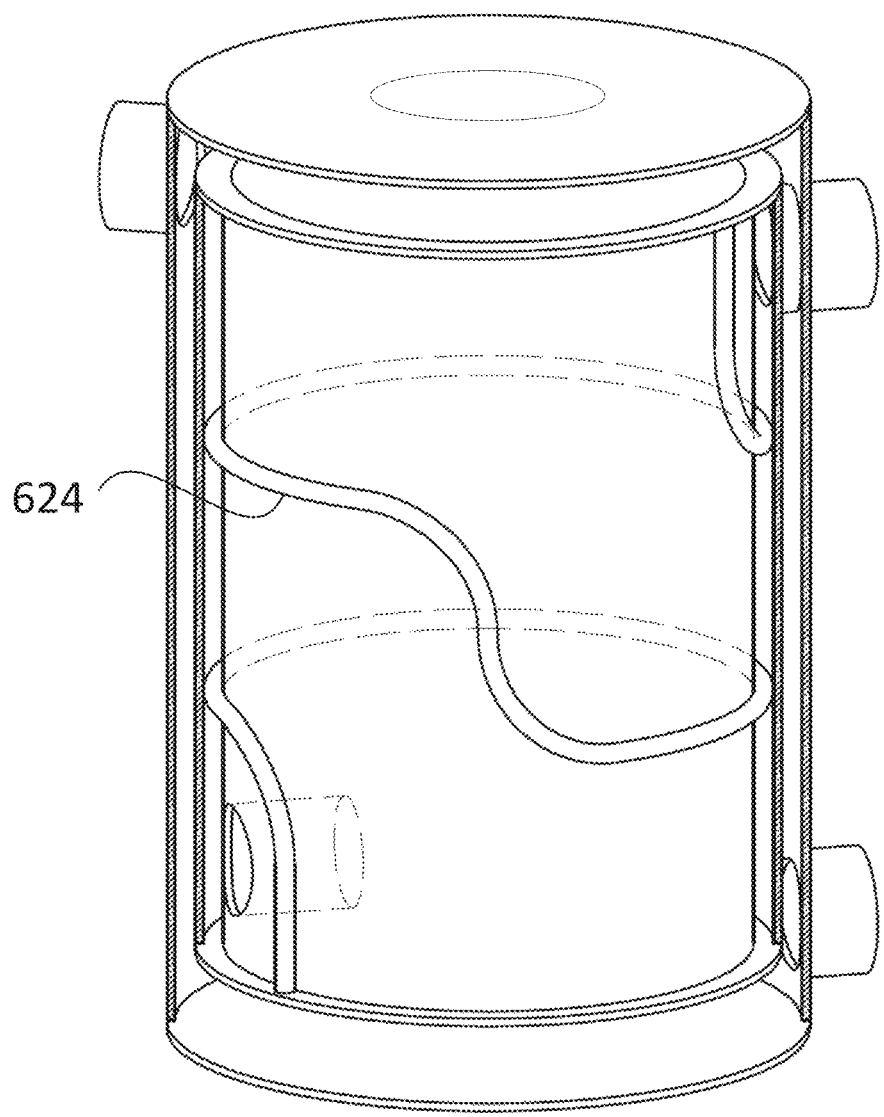
FIG. 6 is a schematic cut-away view of another embodiment of the heat exchanger.
Figure 7:
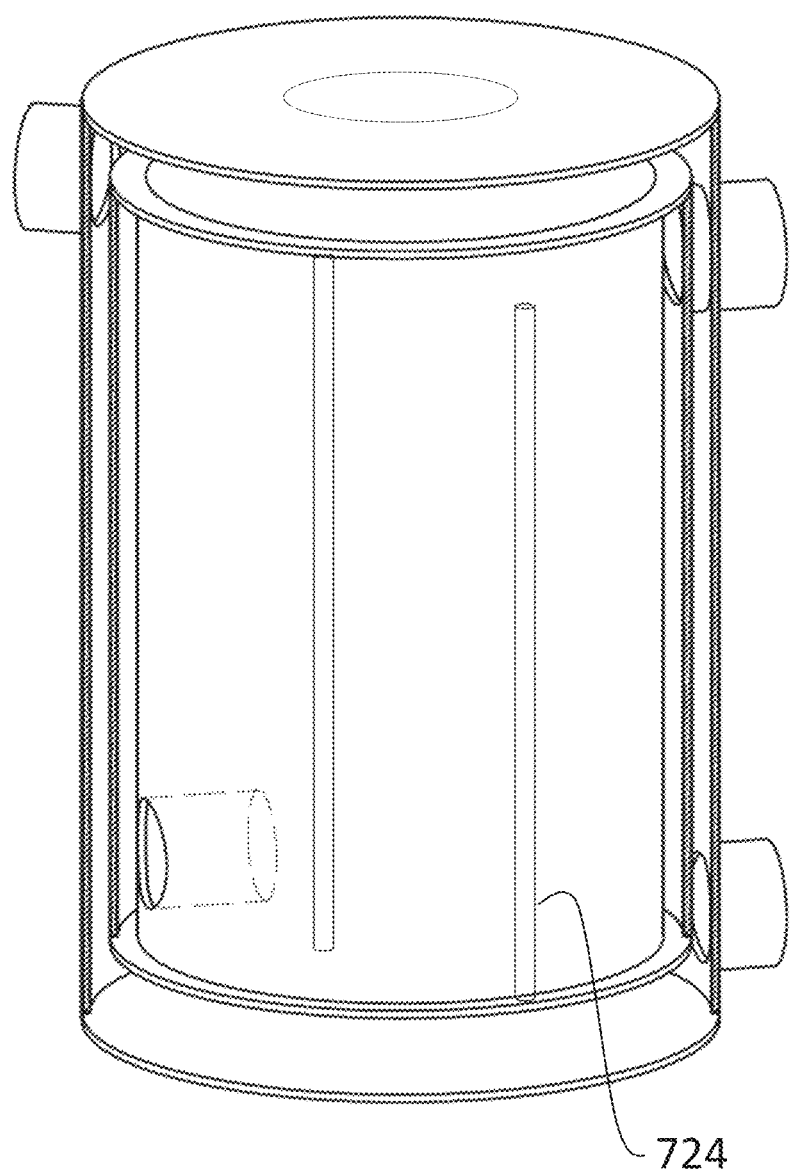
FIG. 7 is a schematic cut-away view of another embodiment of the heat exchanger.

Any suitable number of ribs may be used. For example, as shown in FIG. 1A, a single rib may be used. Alternatively as shown in FIG. 5, a plurality of ribs may be used such as 2 to 100 ribs, e.g., 2, 4, or 8 to 100, 50, or 10 ribs, wherein the foregoing upper and lower bounds can be independently combined. Also, the rib may have any suitable configuration. In an embodiment, the rib may have a helical shape, a stepped shape, a shape of a segment of a circle, a shape of a segment of a helix, or a combination thereof. For example, as shown in FIG. 1A, the rib 124 may have a helical shape. As shown in FIG. 3, a rib 324 may have a spiral triangular shape. Alternatively, as shown in FIG. 5, a rib 524 may have a shape of a segment of a circle. Alternatively, as shown in FIG. 6, a rib 624 may have a stepped shape. In yet another embodiment, as shown in FIG. 7, a rib 724 may have a linear shape.

Figure 8:
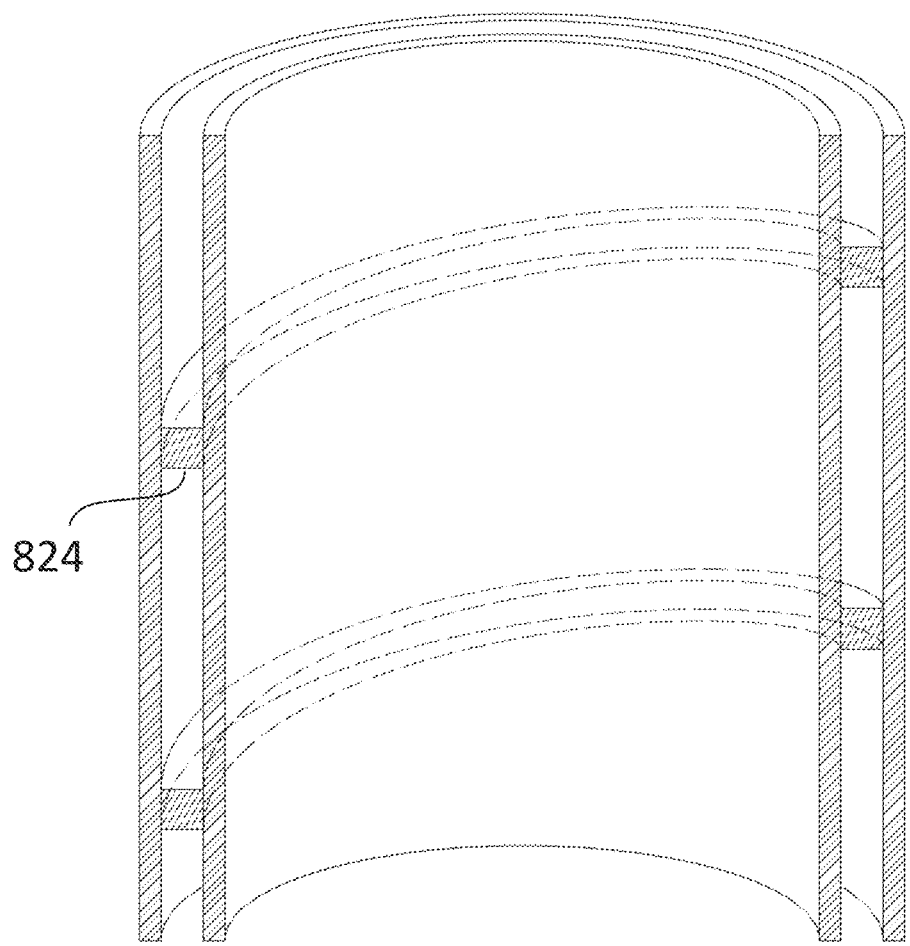
FIG. 8 is a cut-away view of an embodiment of a heat exchanger core.
Figure 9:
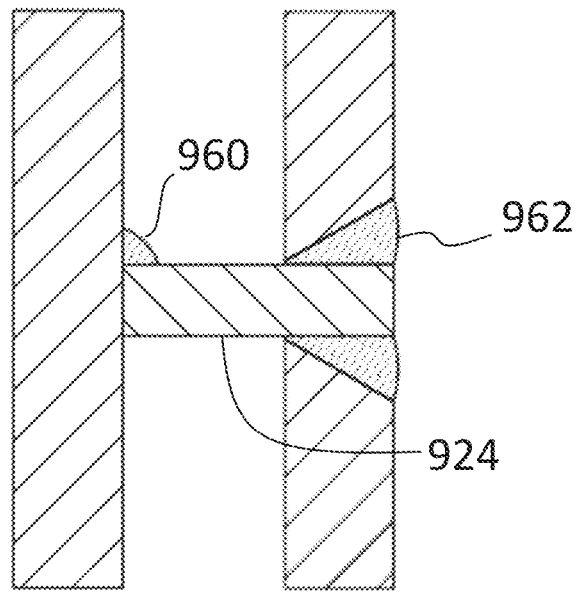
FIG. 9 is a cross-sectional view of an embodiment of the heat exchanger core.
Figure 10:
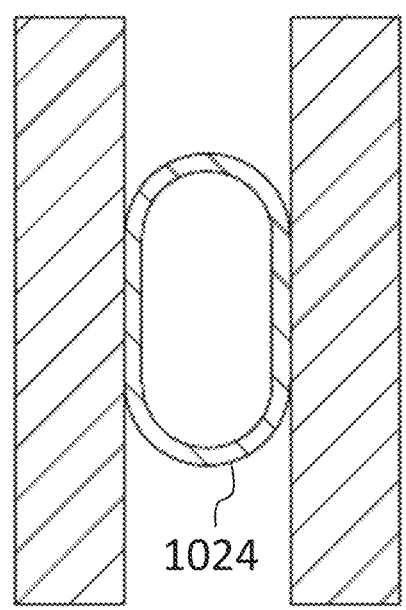
FIG. 10 is a cross-sectional view of an embodiment of the heat exchanger core.
Figure 11:
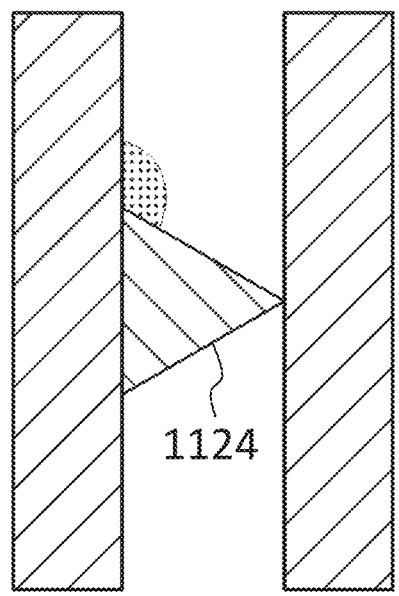
FIG. 11 is a cross-sectional view of an embodiment of the heat exchanger core.
Figure 12:
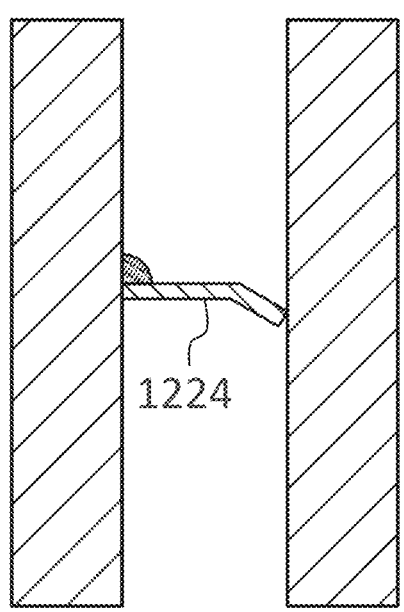
FIG. 12 is a cross-sectional view of an embodiment of the heat exchanger core.

The rib may have any suitable cross-sectional shape. In an embodiment, the rib may have a circular cross-sectional shape, an annular cross-sectional shape, an elliptical cross-sectional shape, an oval cross-sectional shape, a stadium cross-sectional shape, a semicircular cross-sectional shape, a square cross-sectional shape, a rectangular cross-sectional shape, a triangular cross-sectional shape, or combination thereof. For example, as shown in FIG. 1A, the rib may have a circular cross-sectional shape. Alternatively, and as shown in FIG. 8, a rib 824 may have a square cross-sectional shape. In yet another embodiment, as shown in FIG. 9, a rib 924 may have a rectangular cross-sectional shape. In yet another embodiment, as shown in FIG. 10, a rib 1024 may be tubular, i.e., have a hollow center, and may have a stadium cross-sectional shape. In yet another embodiment, as shown in FIG. 11, a rib 1124 may have a triangular cross-sectional shape. Alternatively, the rib may have a rectilinear shape, and if desired the rib may be bent to provide a bent rectilinear rib 1224 as shown in FIG. 12.

The rib may have any suitable cross-sectional dimensions. In a preferred embodiment in which the rib is rectilinear, the rib may have a cross-sectional height and width of the rib may be independently selected, may be 0.3 cm to 600 cm, and may be 0.3 cm, 0.5 cm, 0.6 cm, 1 cm, 10 cm, or 50 cm, to 100 cm, 200 cm, 400 cm, or 600 cm, wherein the foregoing upper and lower bounds can be independently combined and wherein the height is measured in a direction of a major or longitudinal axis of the heat exchanger core and wherein the width is measured in a direction perpendicular to the longitudinal axis of the heat exchanger core. For example, a rectilinear rib may have a height of 0.3 cm to 600 cm and a width of 0.5 cm to 365 cm. A rib having a circular cross-section and having a diameter of 1 cm to 5 cm is specifically mentioned. In an embodiment in which the rib is tubular, a wall thickness of the tubular rib may be 0.1 cm to 1 cm, and may be 0.1 cm, 0.2 cm, or 0.4 cm to 0.6 cm, 0.8 cm, or 1 cm, wherein the foregoing upper and lower bounds can be independently combined.

The rib may contact the first casing and the second casing, may be rigidly attached to one or both of the first casing and the second casing, or may fit loosely between the first and second casings. For example, the rib may form an interference fit with the inner surface of the first casing, the inner surface of the second casing, or a combination thereof. In another embodiment, the first casing and the rib, the second casing and the rib, or a combination thereof may be rigidly attached at one point, or at a plurality of points along the length of the rib. The attachment may be provided by any suitable attachment member, such as a weld, an adhesive, a fastener, or combination thereof. Use of a weld, such as a spot or stitch weld, is specifically mentioned. Alternatively, a continuous weld extending the length of the rib may be used. Also, the rib may be rigidly attached to the first casing by a first weld and rigidly attached to the second casing by a second weld, wherein the first weld and the second weld may be the same type of weld or may be different types of welds. The rib may be stitch-welded to the first or second casing anywhere along its length, or continuously welded along its length, to hold the rib in a selected position relative to the first casing, the second casing, or both. For example, as shown in FIG. 9, the rib may be welded to an inner surface of the first casing by a fillet weld 960 and the rib seam or butt welded to the second casing. Alternatively, the fillet weld may be used to attach the rib to the inner surface of the second casing and the rib seam or butt welded to the first casing. A seam weld, such as seam weld 962 shown in FIG. 9, may be used to rigidly attach the rib to the first casing, the second casing, or combination thereof.

Figure 13:
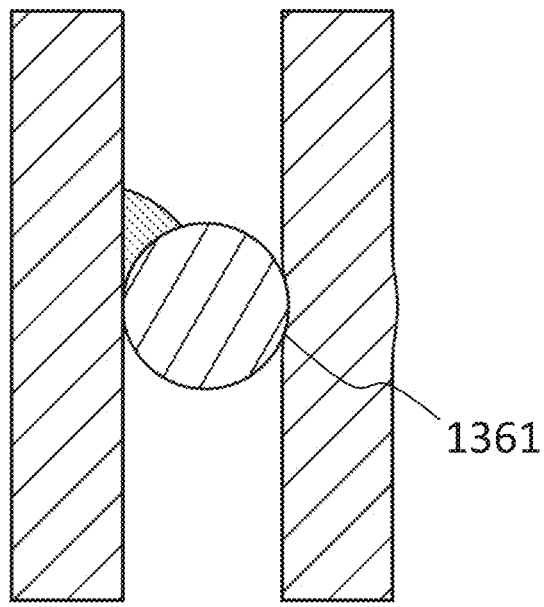
FIG. 13 is a cross-sectional view of an embodiment of the heat exchanger core.
Figure 14:
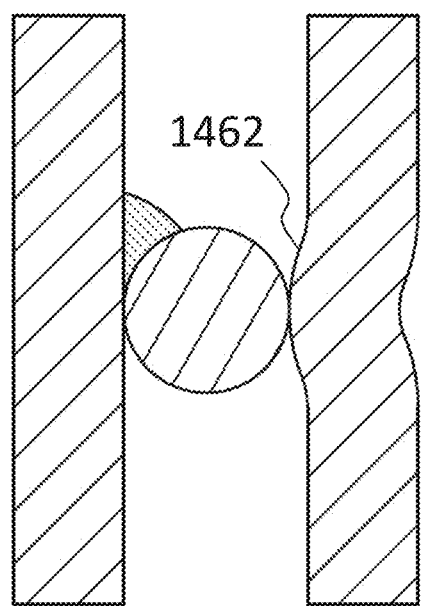
FIG. 14 is a cross-sectional view of an embodiment of the heat exchanger core.

In yet another embodiment, the first casing, the second casing, or combination thereof may be deformed to secure the rib. For example, as shown in FIG. 13, the first casing, the second casing, or combination thereof may comprise a groove 1361 which is configured to accept the rib. In yet another embodiment, the first casing, the second casing, or combination thereof may be deformed to provide a ridge 1462 as shown in FIG. 14 which protrudes in a direction of and optionally contacts the rib.

The rib may have a pitch, e.g., a slope, having any suitable angle with respect to a longitudinal axis of the heat exchanger core, the inner casing, or the outer casing. As illustrated in FIG. 1A, a pitch θ may be defined with respect to a tangent direction t, wherein the tangent direction is perpendicular to a longitudinal axis of the outer casing. In an embodiment, a pitch of the rib is 0 degrees to 90 degrees with respect to the tangent direction, and can be 0 degrees, 2 degrees, or 5 degrees to 90 degrees, 50 degrees, or 45 degrees with respect to the tangent direction, wherein the foregoing upper and lower bounds can be independently combined. A pitch of 5 degrees to 45 degrees with respect to the tangent direction is specifically mentioned. In an embodiment, the heat exchanger core comprises a plurality of ribs, and a pitch of each rib of the plurality of ribs may each independently be 0 degrees to 90 degrees with respect to the tangent direction, and can be 0 degrees, 2 degrees, or 5 degrees to 90 degrees, 50 degrees, or 45 degrees with respect to the tangent direction, wherein the foregoing upper and lower bounds can be independently combined. An embodiment in which the pitch is 5 degrees to 45 degrees with respect to the tangent direction is specifically mentioned.

In yet another embodiment, as shown in FIG. 7, the rib may be parallel to an axis, e.g., a longitudinal axis, of the first casing, the second casing, or combination thereof. In an embodiment, the heat exchanger core may comprise a plurality of ribs, and each rib may be parallel to a longitudinal axis of the first casing, the second casing, or combination thereof, for example as illustrated by rib 724 as shown in FIG. 7. In an embodiment, the heat exchanger core comprises a rib which provides a serpentine flow passage between the inlet and the outlet. The serpentine flow passage may be defined by a plurality of linear ribs, or may be defined by a combination of curved ribs and linear ribs.

Figure 17:
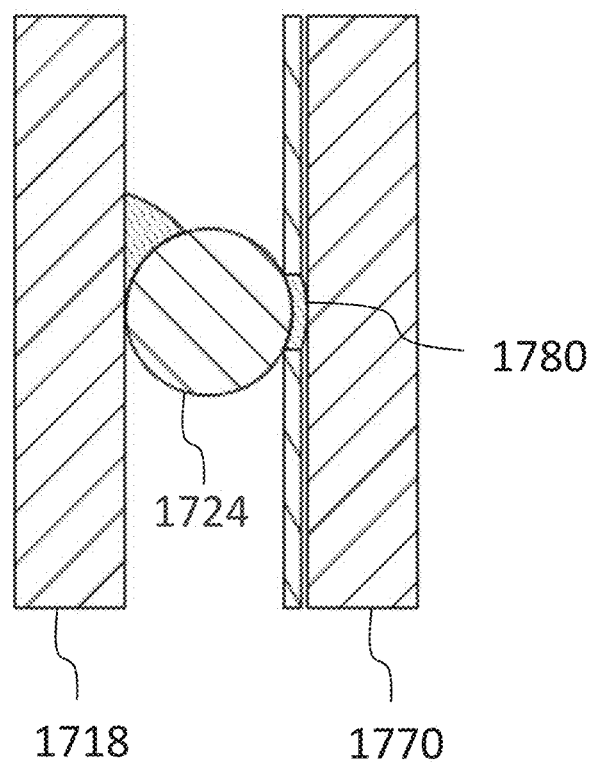
FIG. 17 is a cross-sectional view of an embodiment of the heat exchanger core.
Figure 18:
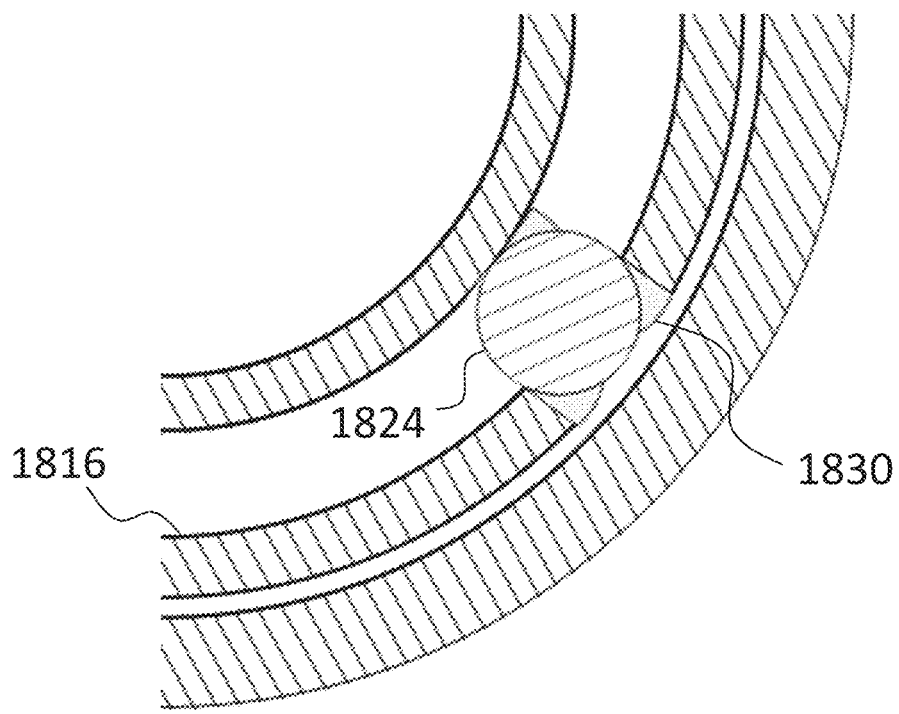
FIG. 18 is a cross-sectional view of an embodiment of the heat exchanger core.

For certain applications, such as to satisfy inspection requirements, a third casing may be desirable. In an embodiment, the third casing 1770 may be disposed adjacent to the concave outer surface of the second casing 1716 and between the top head and the bottom head of the heat exchanger core, e.g., as shown in FIGS. 17 and 18 for an embodiment in which the third casing is on the outer surface of the second casing, and wherein the second casing is in the outer casing. For clarity, also shown in FIG. 17 is the first casing 1718 and the second casing 1724. Alternatively, the third casing may be adjacent a concave outer surface of the first casing, wherein the first casing is an inner casing, if desired. Any suitable configuration of the first casing, the rib, and the second casing may be used in conjunction with the third casing. For example as shown in FIG. 18, a first casing 1816 may be used in conjunction with the third casing and a vertical rib 1824 which protrudes through a slot in the second casing and is held in place by a weld 1830.

The third casing may comprise a same material as is disclosed for the first casing, and may be manufactured using a same method as is disclosed for the first casing, and thus duplicative disclosure of the content and manufacture the third casing is not repeated for clarity.

The bottom head, the first casing, and the second casing of the heat exchanger core are contained entirely within the pressure vessel. In another embodiment, the top head, the bottom head, the first casing, and the second casing of the heat exchanger core are contained entirely within the pressure vessel. In yet another embodiment, an entirety of the heat exchanger core, i.e., the top head, the bottom head, the first casing, the second casing, the inlet, and the outlet are contained entirely within the pressure vessel. As used with respect to the configuration of the heat exchanger core within the pressure vessel, "entirety" means that the component referred to is fully contained within the pressure vessel. For example, when the pressure vessel is filled with a fluid, an entire outer surface of a component of the heat exchanger core which is contained entirely with the pressure vessel would be contacted by the fluid. Thus in use, e.g., when the pressure vessel is filled with a production fluid, an entirety of an outer surface 115 of the bottom head, an entirety of an outer surface 119 of the first casing, and an entirety of an outer surface 117 of the second casing can be contacted by the production fluid. In yet another embodiment the top head may also be contained entirely within the pressure vessel, in which case when the pressure vessel is filled with a production fluid, the production fluid can contact an entire outer surface 113 of the top head as well. In yet another embodiment, an entirety of the heat exchanger core, i.e., the top head, the bottom head, the first casing, the second casing, the inlet, and the outlet, is contained entirely within the pressure vessel.

The heat exchanger further comprises an inlet member 152 or 152A which connects the inlet 120 or 120A, respectively, to an outside of the pressure vessel, e.g. for providing a flow of a thermal transfer fluid, such as a combustion gas, to the inlet of the heat exchanger core. Also, an outlet member 154, which connects the outlet 122 of the heat exchanger core to an outside of the pressure vessel can be provided. Also, the pressure vessel comprises an inlet 155, and an outlet 156 for providing a flow of a production fluid into and out of the pressure vessel.

The heat exchanger may be used to exchange heat between any suitable fluids, i.e., a first fluid and the second fluid, wherein the first and second fluids may each independently be a gas or a liquid. Thus the disclosed heat exchanger may be used as a gas-liquid, liquid-liquid, or gas-gas heat exchanger. In a preferred embodiment the first fluid, which is directed through the heat exchanger core, is a thermal transfer fluid, and may be a combustion gas, e.g., a gas produced by fuel fired combustor, and may comprise water, carbon monoxide, carbon dioxide, or combination thereof. Also, the second fluid, which is directed through the pressure vessel and contacts an entire outer surface of the heat exchanger core, is a production fluid and may comprise water, steam, oil, a thermal fluid, or combination thereof. The thermal fluid may comprise an ester, a diester, a glycol, a silicone, water, a petroleum oil, a mineral oil, or a chlorofluorocarbon such as a halogenated fluorocarbon, a halogenated chlorofluorocarbon, or a perfluorocarbon. A combination comprising at least one of the foregoing may be used. A thermal fluid comprising glycol and water is specifically mentioned. For example, the thermal fluid may be formulated from an alkaline organic or inorganic compound and used in diluted form with a concentration ranging from 3 weight percent to 10 weight percent, based on a total weight of the thermal fluid.

For example, the second fluid may comprise water, and may be used as a production fluid in a domestic, commercial, or industrial heating application. The first fluid, e.g., the thermal transfer fluid, which is directed through the inlet member, through the flow passage of the heat exchanger core, and out the outlet member, does not contact the pressure vessel. As a result, thermal heat energy transfer occurs between the hot first fluid flowing inside the core to the second fluid separately flowing in the pressure vessel. As noted above, the second fluid contacts an entire outer surface of the of the heat exchanger core and at no point does the surface of the pressure vessel contact the first fluid. Because the pressure vessel does not contact the first fluid, which can have a temperature of 10° C. to 1800° C., such as 10° C., 50° C., 100° C., 200° C., or 400° C. to 1800° C., 1600° C., 1400° C., 1200° C., or 1000° C., wherein the foregoing upper and lower bounds can be independently combined, the exterior surface of the pressure vessel remains relatively cool and use of insulation, e.g., a refractory material, to insulate the pressure vessel can be avoided. An embodiment in which the first fluid has a temperature of 100° C. to 1350° C. is specifically mentioned.

The pressure vessel top head, the pressure vessel bottom head, and the pressure vessel shell may each independently have any suitable shape, and may be rectilinear or curvilinear, and may be flat, domed, or spherical. For example, as shown in FIG. 1A, the pressure vessel top head and the pressure vessel bottom head may have a flat shape. Alternatively, as shown in FIG. 1B, the pressure vessel top head and the pressure vessel bottom head may have a curved shape. Also, the pressure vessel shell may have any suitable shape, maybe curvilinear or rectilinear, and may be cylindrical as shown in FIG. 1A.

Also disclosed is a method of manufacturing a heat exchanger core, the method comprising: providing a first casing, e.g., an inner casing; disposing a rib on an inner surface of the first casing; providing a second casing, e.g., an outer casing, comprising a slot; aligning the rib and the slot by disposing the first casing on the second casing; rigidly attaching the rib to the second casing; disposing a top head on a first end of the second casing; disposing a bottom head on a second end of the second casing; disposing an inlet on the first casing, the second casing, or a combination thereof; and disposing an outlet on the first casing, the second casing, or a combination thereof to manufacture the heat exchanger core, wherein the rib, the first casing, and the second casing define a flow passage between the inlet and the outlet. In an embodiment the first casing is in inner casing. Alternatively, the first casing may be an outer casing. The flow passage may be defined by the inner surface of the first casing, the inner surface of the second casing and the rib.

Figure 15:
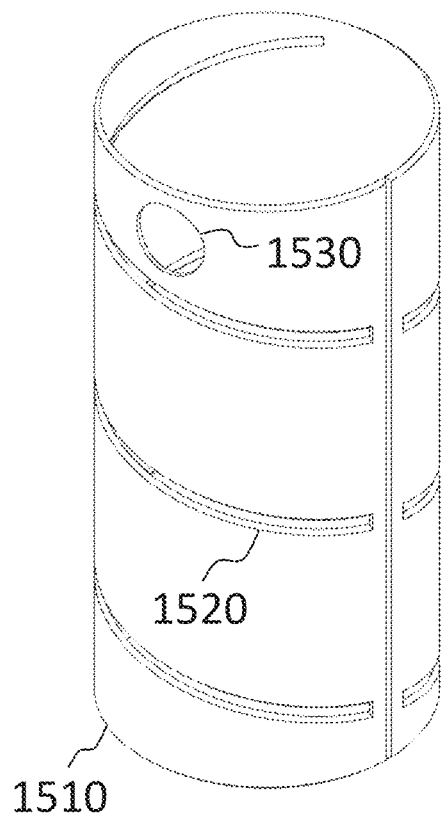
FIG. 15 is side view of an embodiment of a slotted outer casing.

The first casing may be a tube or a section of a pipe, for example, and may be provided by rolling a flat sheet and connecting opposite edges to provide a tube. The rib may be disposed on the inner surface of the first casing by any suitable method, such as by welding, adhesive bonding, or fastening, or combination thereof. In a preferred embodiment the rib is welded to the surface of the first casing. An embodiment in which the rib is welded to the surface of the first casing using a fillet weld is specifically mentioned. The fillet weld may transverse an entire length of the rib, or may be present on a portion of the rib, such as 10% to 90% of the total rib length, e.g., 10%, 15%, or 20% to 90%, 80%, or 70% of the total rib length, wherein the foregoing upper and lower bounds can be independently combined. An embodiment in which the fillet weld transverses 100% of the total rib length is specifically mentioned. A slotted casing 1500 may comprise a slot 1510, and optionally an outlet 1522, as shown in FIG. 15, for example. The second casing may be provided, for example, by cutting a slot at a selected pitch angle in a pipe. The slot may have a width selected to correspond to a dimension of the rib and may have a width of 1 millimeter (mm) to 5 centimeters (cm). In an embodiment, a width of the slot is 1 mm, 2 mm, or 4 mm to 5 cm, 3 cm, or 1 cm, wherein the foregoing upper and lower bounds can be independently combined. An embodiment in which a width of the slot is 2 mm to 2 cm is specifically mentioned. Also, in an embodiment the slot may comprise a bevel to facilitate the formation of a weld between the outer casing and the rib. The outer casing comprising the slot may be disposed on the inner casing comprising the rib and then the rib rigidly attached to the outer casing by welding, for example. Use of a full penetration weld or butt weld is specifically mentioned, and the weld may be selected based upon the shape and dimensions of the rib. The top head of the heat exchanger core may be welded to the first end of each of the first casing and the second casing, and the bottom head of the heat exchanger core welded to the opposite second end of each of the first casing and the second casing, for example, to form a cavity between the first casing and the second casing for the thermal transfer fluid. The inlet and the outlet may each independently be disposed, e.g., welded, on the first casing the second casing or combination thereof. An embodiment in which the inlet is disposed on an outer surface of the first casing, and in which the outlet is disposed on an outer surface of the second casing is specifically mentioned. Also, if desired, an inlet member, which connects the inlet to an outside of the pressure vessel, e.g., to the source of a thermal transfer fluid, may be disposed on the inlet. In addition, an outlet member, which connects the outlet to an outside of the pressure vessel, e.g., to a vent, may be disposed on the outlet.

Figure 16:
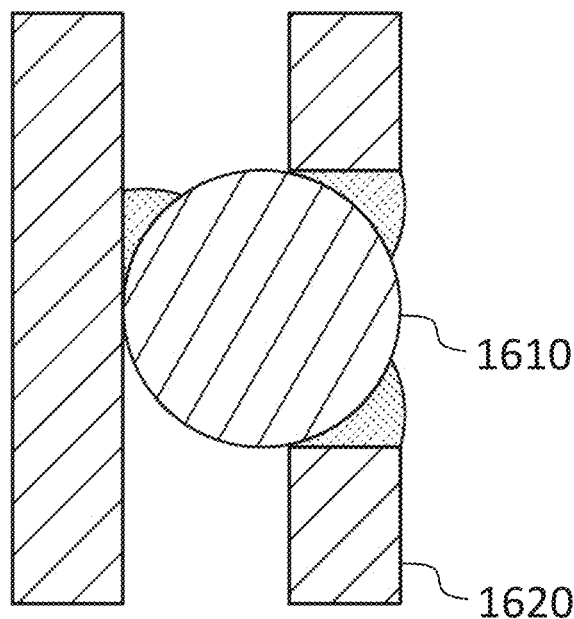
FIG. 16 is a cross-sectional view of an embodiment of the heat exchanger core.

In an embodiment, the dimensions of the rib and the dimensions of the gap in the slotted casing may be selected so that when the first and second casings are in their final positions, an outer surface of the rib 1610 protrudes up to, or beyond, an outer surface of the second casing 1620, as shown in FIG. 16. As shown in FIG. 16, the rib and the second casing may be rigidly attached using a seam weld, for example.

Alternatively, a cross-sectional width of a rectilinear rib can be selected to the equal to or greater than a desired gap between the first casing and the second casing plus the width of the first casing, the second casing, or combination thereof. As shown in FIG. 9, the outer casing may be aligned over the inner casing and the rib assembly, and then the outer casing rigidly attached to the rib by welding, for example. Use of a seam weld is specifically mentioned.

In another embodiment, the method of manufacturing a heat exchanger core comprises providing a first casing; disposing a rib on an inner surface of the first casing; providing a second casing member; disposing, e.g., wrapping, the second casing member on an outer surface of the first casing; rigidly attaching longitudinal edges of the second casing member to form a second casing; disposing a top head on an upper end of each of the first casing and the second casing; disposing a bottom head on a lower end of each of the first casing and the second casing; disposing an inlet on the first casing, the second casing, or combination thereof; and disposing an outlet on the first casing, the second casing, or combination thereof to manufacture the heat exchanger core; wherein the rib, the first casing, and the second casing define a flow passage between the inlet and the outlet. The flow passage may be defined by an inner surface of the first casing, an inner surface of the second casing and the rib. In an embodiment, the first casing is an inner casing and the second casing is outer casing. Alternatively, the first casing may be an outer casing and the second casing may be in inner casing. Details of the disposing, e.g., welding, are similar to as disclosed above, and thus repeated description is not included for clarity.

If desired, a third casing may be disposed on an outer surface of the second casing, as shown in FIG. 17. A method of disposing the third casing can be the same as disclosed for the second casing, and repetitive disclosure is not included herein for clarity.

The casing comprising a slot may be provided from a flat metal sheet. In an embodiment, the providing the casing comprising the slot comprises providing a metal sheet, cutting a slot in the metal sheet to provide a slotted metal sheet, wherein a direction of the slot forms an angle of 0 degrees to 90 degrees, e.g., 0 degrees, 2 degrees, or 5 degrees to 90 degrees, 50 degrees, or 45 degrees with respect to a longitudinal edge of the metal sheet, wherein the foregoing upper and lower bounds can be independently combined, bending the metal sheet so that longitudinal edges of the metal sheet are adjacent each other, and joining the longitudinal edges to provide the slotted casing. In an embodiment, as illustrated in FIG. 15, the slotted casing 1500 comprising the slot 1510 and the outlet 1522 can be provided by rolling a flat slotted sheet to form a cylinder and then connecting, e.g., welding, the longitudinal edges of the metal sheet to form the cylinder. An embodiment in which a direction of the slot forms an angle of about 2 degrees to 45 degrees with respect to the longitudinal edge of the metal sheet is specifically mentioned. The configuration and angle of the slot may be selected to correspond to a pitch angle of the rib. The longitudinal edges may be defined using a seam weld, for example. If desired, the method may further comprise cutting an opening in the metal sheet to form the outlet. The dimensions of the metal sheet may be selected in accordance with a desired diameter of the outer casing.

Alternatively, the heat exchanger core can be manufactured by heating an outer casing of the first and second casings to thermally expand the outer casing, or cooling an inner casing of the first and second casings to contract the inner casing, disposing the first casing on the second casing, and then thermally equilibrating the first casing and the second casing. In an aspect, a method of manufacturing a heat exchanger core comprises providing an first casing; disposing a rib on an inner surface of the first casing; providing a second casing; heating or cooling at least one of the first casing and the second casing to expand an outer casing of the first casing and the second casing or contract an inner casing of the first casing and the second casing; disposing the first casing on the second casing; thermally equilibrating the first casing and the second casing to contact at least one of an inner surface of the first casing and the rib and an inner surface of the second casing and the rib; disposing a top head on an upper end of each of the first casing and the second casing; disposing a bottom head on a lower end of each of the first casing and the second casing; disposing an inlet on the first casing, the second casing, or combination thereof; disposing an outlet on the first casing, the second casing, or combination thereof to manufacture the heat exchanger core; wherein the rib, the first casing, and the second casing define a flow passage between the inlet and the outlet.

The casing which is heated, e.g., the first casing or the second casing, may be heated to 200° C. to 2000° C., e.g., 200° C., 300° C., or 400° C. to 2,000° C., 1,000° C., 800° C., or 600° C., wherein the foregoing upper and lower bounds can be independently combined, to expand the casing so that it may be disposed around the colder other casing, e.g., the second casing or the first casing and rib assembly. Heating to 300° C. to 800° C. is specifically mentioned. Once the second casing is in its desired position, it may be allowed to cool and contract and form an interference fit between the rib and an inner surface of the second casing. Alternatively or in addition, the first casing or the second casing may be cooled to −196° C. to 20° C., e.g., −196° C., −150° C., or −80° C. to −20° C., −10° C., 0° C., 10° C., or 20° C., wherein the foregoing upper and lower bounds can be independently combined, to contract an inner casing of the first casing or the second casing so that may be disposed within the hotter other casing. Cooling to −150° C. to −20° C. is specifically mentioned. Thermally equilibrating the first casing and the second casing can form an interference fit between the rib and an inner surface of the second casing.

In yet another aspect, the first casing, the second casing, or a combination thereof may be deformed to contact the rib. In an aspect, the method of manufacturing a heat exchanger core comprises providing an first casing; disposing a rib on an inner surface of the first casing; disposing a second casing on the first casing and the rib; deforming at least one of the first casing and the second casing to contact at least one of the first casing and the rib and the second casing and the rib; disposing a top head on an upper end of each of the first casing and the second casing; disposing a bottom head on a lower end of each of the first casing and the second casing; disposing an inlet on the first casing, the second casing, or combination thereof; and disposing an outlet on the first casing, the second casing, or combination thereof to manufacture the heat exchanger core, wherein the rib, the first casing, and the second casing define a flow passage between the inlet and the outlet.

The deforming may comprise providing a concave surface or a convex surface. The casing comprising the deformation may be provided by disposing a casing member on the first casing and the rib, and then compressing or expanding the casing member to form a second casing comprising the concave surface. Alternatively, the casing member may be deformed, for example by stamping, to provide a casing member comprising the convex surface. In yet another embodiment, the first casing may be expanded, e.g., hydraulically or pneumatically, for example, or contracted by crushing, for example, to expand or contract the first casing and the rib so that the rib contacts the second casing. The pressure, force or stress applied to provide the desired deformation can be selected based on the geometry, dimension, component materials, and manufacturing method used to dispose the inner and outer casings. Specifically, the magnitude of the pressure, force or stress can be determined based on the yield stress of the component materials undergoing deformation using industry standard methods and data known to persons of skill in the art of manufacturing.

In yet another embodiment, a method of manufacturing a heat exchanger core comprises providing a first casing; disposing a tubular rib on the first casing; disposing the first casing on a second casing; expanding the rib so that the expanded rib contacts the first casing and the second casing; disposing a top head on an upper end of each of the first casing and the second casing; disposing a bottom head on a lower end of each of the first casing and the second casing; disposing an inlet on the first casing, the second casing, or combination thereof; and disposing an outlet on the first casing, the second casing, or combination thereof to manufacture the heat exchanger core, wherein the rib, the first casing, and the second casing define a flow passage between the inlet and the outlet.

The tubular rib may be expanded by any suitable method, and may be expanded pneumatically or hydraulically.

In yet another embodiment, a method of manufacturing the heat exchanger core comprises providing a first casing; disposing a rib on an inner surface of the first casing; providing a second casing, wherein an inner surface of the second casing comprises a groove, which is configured to receive the rib; rotating the first casing relative to the second outer casing to thread the first casing into the second casing to dispose the first casing on the second casing; disposing a top head on an upper end of each of the first casing and the second casing; disposing a bottom head on a lower end of each of the first casing and the second casing; disposing an inlet on the first casing, the second casing, or combination thereof; and disposing an outlet on the first casing, the second casing, or combination thereof to manufacture the heat exchanger core, wherein the rib, the first casing, and the second casing define a flow passage between the inlet and the outlet. If desired, the method may further comprise expanding or contracting the first casing so that the rib contacts the first casing and the second casing.

The groove may be a spiral groove and may be configured to permit screwing the first casing onto the second casing and the rib. The groove may be provided by any suitable method, such as machining, casting or deformation.

The first casing may be an inner casing, and the second casing may be an outer casing. Alternatively, the first casing may be an outer casing, and the second casing may be an inner casing.

Also disclosed is a method of manufacturing a heat exchanger core, the method comprising: providing a first casing; disposing a rib on an inner surface of the first casing; providing a second casing; contacting the rib and the second casing by inserting the first casing into the second casing; disposing a top head on an upper end of each of the first casing and the second casing; disposing a bottom head on a lower end of each of the first casing and the second casing; disposing an inlet on the first casing, the second casing, or combination thereof; and disposing an outlet on the first casing, the second casing, or combination thereof to manufacture the heat exchanger core, wherein the rib, the first casing, and the second casing define a flow passage between the inlet and the outlet.

In an embodiment, the rib has a bar shape, and as shown in FIG. 12, preferably comprises a bend. When the first casing is inserted, e.g., forcibly inserted, into the second casing, the rib may be deformed so that a tip of the rib contacts and forms a seal, e.g., an interference fit, with the second casing.

Also disclosed is a method of manufacturing a heat exchanger, the method comprising: providing a shell; disposing a pressure vessel bottom head on the shell; disposing the heat exchanger core in the shell; and disposing a pressure vessel top head on the shell to manufacture the heat exchanger, wherein the pressure vessel top head, the pressure vessel bottom head, the shell, or a combination thereof, comprises a pressure vessel inlet, and wherein the pressure vessel top head, the pressure vessel bottom head, the shell, or a combination thereof comprises a pressure vessel outlet.

Also disclosed is a method of transferring heat between a first fluid and a second fluid, the method comprising: providing the heat exchanger; directing a first fluid into the pressure vessel inlet; and directing a second fluid into the inlet of the heat exchanger core to exchange heat between the first fluid and the second fluid.

The invention has been described with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. Also, the element may be on an outer surface or on an inner surface of the other element, and thus "on" may be inclusive of "in" and "on."

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes," and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

What is claimed is:

1. A method for heating a production fluid disposed in a vessel, comprising:
    providing a tubeless heat exchanger, comprising:
        a tubeless heat exchanger core disposed at least partially within the vessel, the tubeless heat exchanger core comprising an inner casing and an outer casing disposed around the inner casing, the inner and outer casings defining therebetween a flow passage for a thermal transfer fluid to flow, the tubeless heat exchanger core further comprising a core inlet arranged to receive the thermal transfer fluid and a core outlet arranged to provide the thermal transfer fluid, the core inlet and core outlet being fluidically connected to the flow passage, and at least one of the core inlet and core outlet being disposed on the inner casing; and
        wherein each of the outer casing and the inner casing has an inner surface and an outer surface, wherein the respective inner surfaces face each other and define therebetween the flow passage for the thermal transfer fluid to flow from the core inlet to the core outlet and wherein at least a portion of the respective outer surfaces are arranged to be contacted by the production fluid, and wherein the flow passage defines a circumferential path comprising at least one pass around a perimeter of the heat exchanger core;

providing the thermal transfer fluid into the core inlet to transfer heat from the thermal transfer fluid to the production fluid through at least a portion of both the inner and outer casings;

providing an outlet member, which penetrates the vessel and which fluidically connects the core outlet through the vessel to provide the thermal transfer fluid outside of the vessel; and providing a conduit fluidically connected to the heat exchanger core, and arranged to provide the thermal transfer fluid to the heat exchanger core, the conduit having a conduit outlet end fluidically connected to the core inlet and a conduit inlet end arranged to receive the thermal transfer fluid, wherein the conduit is configured to provide the thermal transfer fluid from the conduit inlet, along the conduit to the conduit outlet and the core inlet to the flow passage, wherein the conduit comprises a conduit outer surface, at least a portion of the conduit outer surface also arranged to be contacted by the production fluid, and wherein the flow passage comprises a flow passage guide, the flow passage guide comprising a rib to guide the flow of the thermal transfer fluid along the flow passage from the core inlet to the core outlet.

2. The method of claim 1, wherein the flow passage guide is loosely disposed a surface of the inner casing, the outer casing, or a combination thereof along part of all of the length of the low passage guide.

3. The method of claim 1, wherein the inner casing and the flow passage guide, the outer casing and the flow passage guide, or a combination thereof are in interference contact along part or all of the length of the flow passage guide.

4. The method of claim 1, wherein the flow passage guide is rigidly attached to the inner casing, the outer casing, or a combination thereof.

5. The method of claim 1, wherein the inner casing and the flow passage guide, the outer casing and the flow passage guide, or a combination thereof are rigidly attached by a weld.

6. The method of claim 1, wherein a pitch of the flow passage guide is between 0 degrees and 90 degrees with respect to a tangent direction, wherein the tangent direction is perpendicular to a longitudinal axis of the outer casing.

7. The method of claim 1, wherein the inner casing and the outer casing each independently have a circular cross-sectional shape, an elliptical cross-sectional shape, an oval cross-sectional shape, a stadium cross-sectional shape, a semicircular cross-sectional shape, a square cross-sectional shape, a rectangular cross-sectional shape, a triangular cross-sectional shape, or combination thereof.

8. The method of claim 1, wherein the inner casing is coaxial with the outer casing.

9. The method of claim 1, wherein the flow passage has a circular cross-sectional shape, an annular cross-sectional shape, an elliptical cross-sectional shape, an oval cross-sectional shape, a stadium cross-sectional shape, a semicircular cross-sectional shape, a square cross-sectional shape, a rectangular cross-sectional shape, a triangular cross-sectional shape, or combination thereof.

10. The method of claim 1, wherein the flow passage is contained entirely within the vessel.

11. The method of claim 1, wherein the outer surfaces of the inner casing, the outer casing, and the bottom head are contacted by the production fluid.

12. The method of claim 1, wherein the core inlet is disposed on the inner casing.

13. The method of claim 1, wherein the outlet member mechanically attaches the core outlet to the vessel to provide mechanical support for the heat exchanger core and to avoid thermal stresses in the heat exchanger core within the vessel.

14. The method of claim 1, wherein the vessel has a vessel inlet arranged to receive production fluid and a vessel outlet arranged to provide heated production fluid.

15. A method for heating a production fluid disposed in a vessel, comprising:
providing a tubeless heat exchanger, comprising:
a tubeless heat exchanger core disposed at least partially within the vessel, the tubeless heat exchanger core comprising an inner casing and an outer casing disposed around the inner casing, the inner and outer casings defining therebetween a flow passage for a thermal transfer fluid to flow, the tubeless heat exchanger core further comprising a core inlet arranged to receive the thermal transfer fluid and a core outlet arranged to provide the thermal transfer fluid, the core inlet and core outlet being fluidically connected to the flow passage, and at least one of the core inlet and core outlet being disposed on the inner casing; and
wherein each of the outer casing and the inner casing has an inner surface and an outer surface, wherein the respective inner surfaces face each other and define therebetween the flow passage for the thermal transfer fluid to flow from the core inlet to the core outlet and wherein at least a portion of the respective outer surfaces are arranged to be contacted by the production fluid, and wherein the flow passage defines a circumferential path comprising at least one pass around a perimeter of the heat exchanger core, and wherein the inner casing and the outer casing have a cone shape or a cylinder shape;
providing the thermal transfer fluid into the core inlet to transfer heat from the thermal transfer fluid to the production fluid through at least a portion of both the inner and outer casings;
providing an outlet member, which penetrates the vessel and which fluidically connects the core outlet through the vessel to provide the thermal transfer fluid outside of the vessel; and
providing a conduit fluidically connected to the heat exchanger core, and arranged to provide the thermal transfer fluid to the heat exchanger core, the conduit having a conduit outlet end fluidically connected to the core inlet and a conduit inlet end arranged to receive the thermal transfer fluid,
wherein the conduit is configured to provide the thermal transfer fluid from the conduit inlet, along the conduit to the conduit outlet and the core inlet to the flow passage,
wherein the conduit comprises a conduit outer surface, at least a portion of the conduit outer surface also arranged to be contacted by the production fluid, and
wherein the flow passage comprises a flow passage guide, the flow passage guide comprising a rib to guide the flow of the thermal transfer fluid along the flow passage from the core inlet to the core outlet.

16. The method of claim 15, wherein the flow passage guide is loosely disposed a surface of the inner casing, the outer casing, or a combination thereof along part of all of the length of the low passage guide.

17. The method of claim 15, wherein the flow passage guide is rigidly attached to the inner casing, the outer casing, or a combination thereof.

18. A fluid heating system having a hydronic, steam or thermofluidic boiler, for heating a production fluid using a thermal transfer fluid, the production fluid being contained in a vessel, comprising:
   an electric blower configured to receive ambient air and electrical input power and to provide output source air;
   a combustion system configured to receive the source air from the electric blower and to receive fuel and to provide the thermal transfer fluid at a combustion system exit;
   a heat exchanger configured to receive the thermal transfer fluid from the combustion system exit and configured to be in thermal communication with the production fluid to provide convective heat exchange from the thermal transfer fluid to the production fluid, and to provide output exhaust gas to an exhaust flue having an exhaust flue inlet, further comprising:
   a tubeless heat exchanger core disposed at least partially within the vessel, the tubeless heat exchanger core comprising an inner casing and an outer casing disposed around the inner casing, the inner and outer casings defining therebetween a flow passage for a thermal transfer fluid to flow, the tubeless heat exchanger core further comprising a core inlet arranged to receive the thermal transfer fluid and a core outlet arranged to provide the thermal transfer fluid, the core inlet and core outlet being fluidically connected to the flow passage, and at least one of the core inlet and core outlet being disposed on the inner casing; and
   wherein each of the outer casing and the inner casing has an inner surface and an outer surface, wherein the respective inner surfaces face each other and define therebetween the flow passage for the thermal transfer fluid to flow from the core inlet to the core outlet and wherein at least a portion of the respective outer surfaces are arranged to be contacted by the production fluid, and wherein the flow passage defines a circumferential path comprising at least one pass around a perimeter of the heat exchanger core; and
   wherein the flow passage comprises a flow passage guide, the flow passage guide comprising a rib to guide the flow of the thermal transfer fluid along the flow passage from the core inlet to the core outlet.

19. The system of claim 18, wherein the flow passage guide is loosely disposed a surface of the inner casing, the outer casing, or a combination thereof along part of all of the length of the low passage guide.

20. The system of claim 18, wherein the flow passage guide is rigidly attached to the inner casing, the outer casing, or a combination thereof.

* * * * *